Aug. 30, 1932.    M. E. DAVIS    1,874,173
CUTTER
Filed May 26, 1931    4 Sheets-Sheet 2

INVENTOR
MAURICE E. DAVIS.
By Ely H Barrow
ATTORNEYS

Aug. 30, 1932.  M. E. DAVIS  1,874,173
CUTTER
Filed May 26, 1931  4 Sheets-Sheet 4

INVENTOR
MAURICE E. DAVIS
BY Ely & Barrow
ATTORNEYS

Patented Aug. 30, 1932

1,874,173

UNITED STATES PATENT OFFICE

MAURICE E. DAVIS, OF AKRON, OHIO, ASSIGNOR TO THE LEO MEYER COMPANY, OF AKRON, OHIO, A CORPORATION OF OHIO

CUTTER

Application filed May 26, 1931. Serial No. 540,032.

This invention relates to cutters and particularly to cutters for use in producing strips of rubberized laminated cord or fabric material from vulcanized structures such as worn or defective tire carcasses, belting, etc.

To produce strips of rubberized fabric material from such material as worn or defective tire carcasses, cutters of various kinds have heretofore been used, but these have been incapable of producing strips with substantially square cut true edges. Rubber is cut with great difficulty and the edges of cut strips of composite rubberized cord structure have heretofore been more or less tapered or beveled and uneven.

The general purpose of the present invention is to provide a cutting machine for cutting rubberized fabric structures with substantially square true edges in a simple, effective and yet economical manner.

The foregoing and other purposes of the invention are attained in the cutting machine illustrated in the accompanying drawings and described below. It is to be understood that the invention is not limited to the specific form thereof shown and described.

Of the accompanying drawings.

Figure 1:
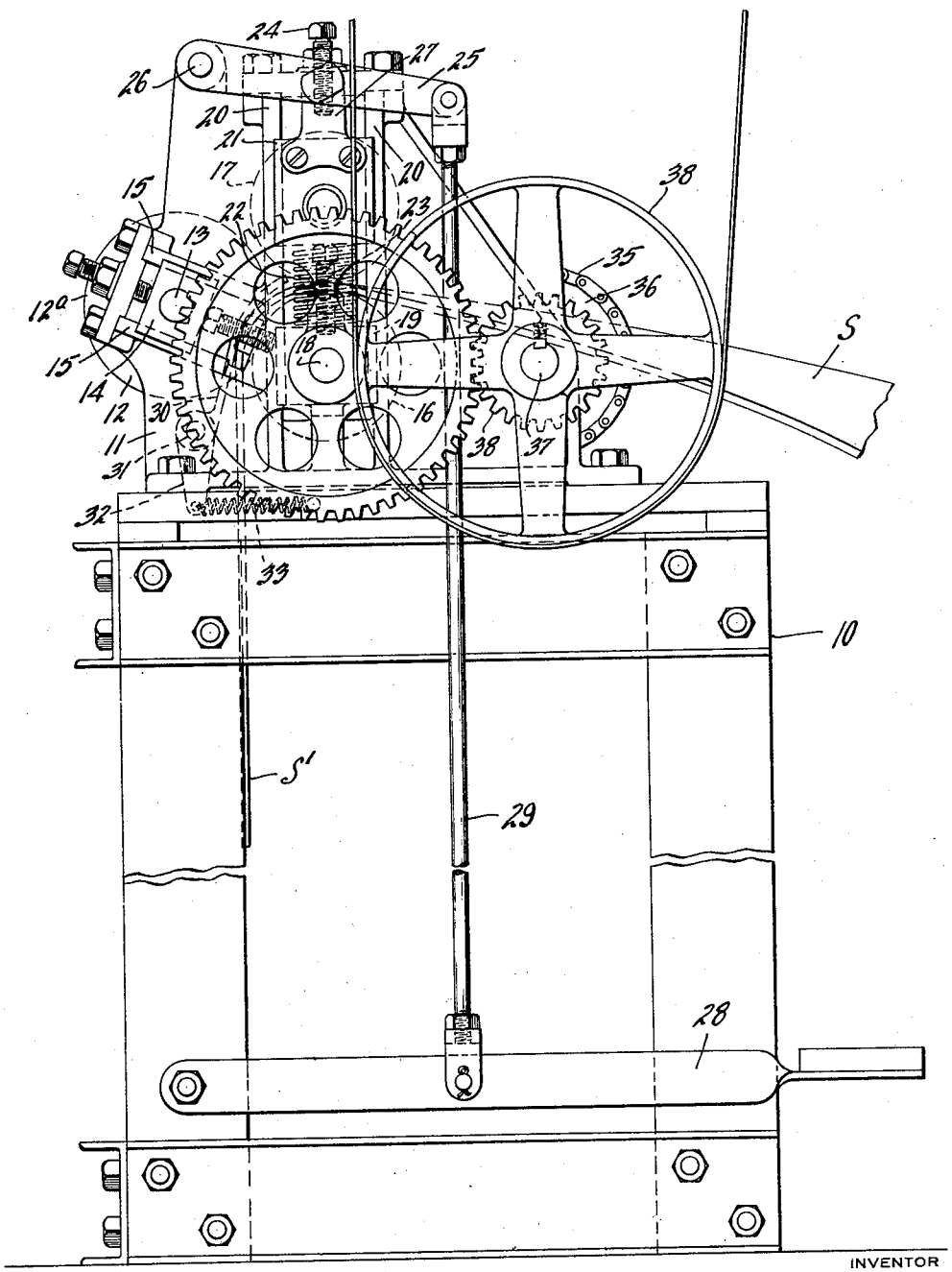
Figure 1 is a side elevation of a cutting machine embodying the invention.
Figure 2:
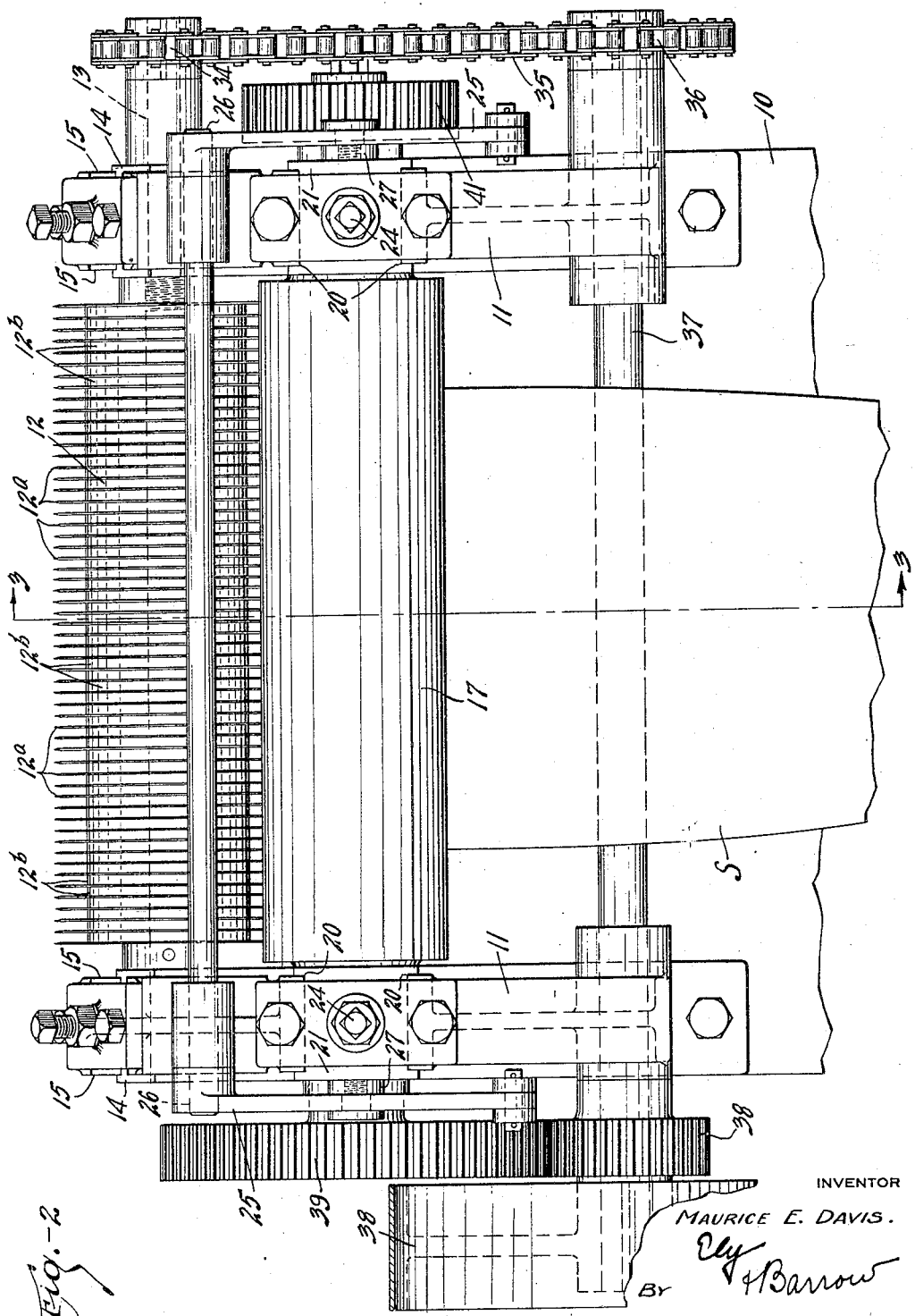
Figure 2 is a plan view thereof.
Figure 3:
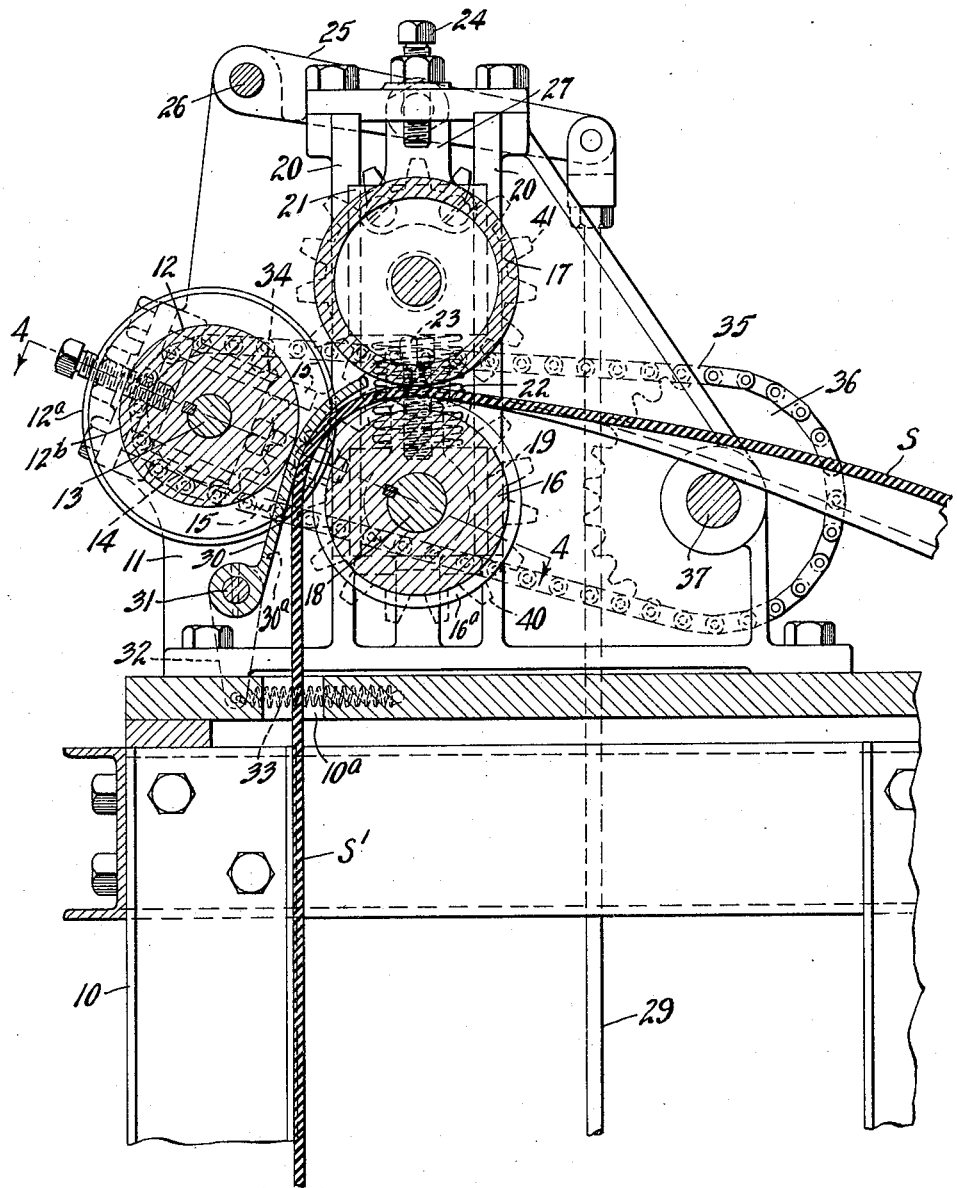
Figure 3 is a section on line 3—3 of Figure 2.

Referring to the drawings, the numeral 10 designates a suitable supporting structure upon which a pair of brackets 11, 11 for supporting the cutter are mounted. A rotary cutter 12 is secured upon a shaft 13 journaled in bearings 14, 14 which may be adjustably mounted as shown in suitable guides 15, 15 arranged on brackets 11. The cutter 12 includes a series of cutter discs $12^a$, $12^a$ spaced apart along shaft 13 by spacer sleeves $12^b$, $12^b$.

For feeding the stock, such as tire carcass material to the cutter $12^a$ a pair of cooperating feeding rollers 16 and 17 are provided. Roller 16 is secured upon a shaft 18 journaled in bearings 19, 19 removably mounted in the bottoms of guides 20, 20 on brackets 11, 11. Roller 17 is journaled in bearings 21, 21 slidable in guides 20 whereby roller 17 may be moved toward and from roller 16. Springs as indicated at 22 are arranged between the bearings 19 and 21 for normally urging the rollers 16 and 17 apart and adjustable screws indicated at 23 are provided between the bearings to limit the relative movement of the rollers together. Adjustable screws 24 may be provided to limit the relative movement of the rollers apart under the action of springs 22. The rollers may be relatively moved toward and from each other by pivotally connecting levers 25, 25 pivoted at 26, 26 on brackets 11 with brackets 27, 27 on bearings 21 and operating the levers 25 by a treadle 28 from which connecting rods 29, 29 extend to levers 25.

Figure 4:
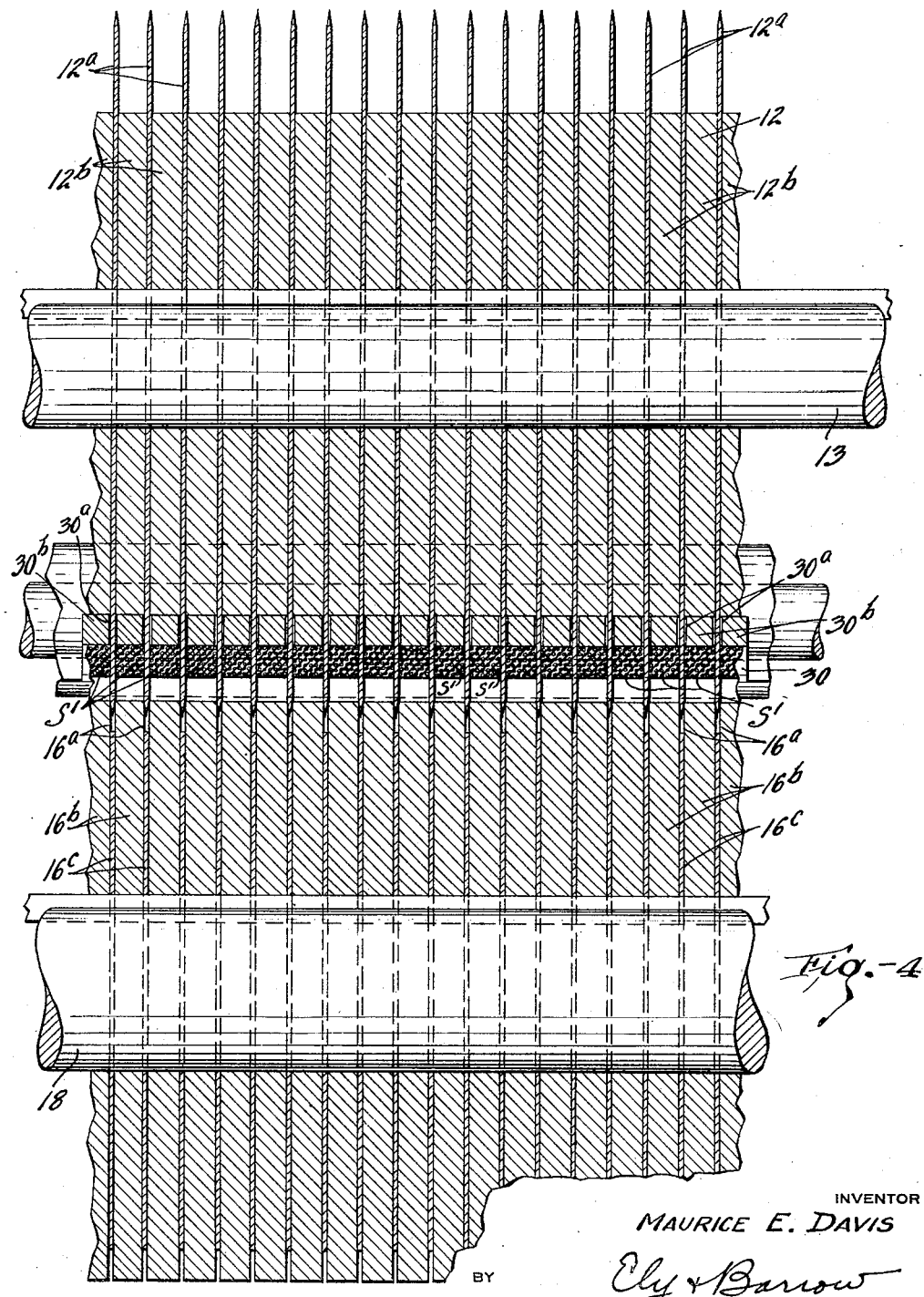
Figure 4 is a part of a section, enlarged, on line 4—4 of Figure 3.

To insure square and true cutting, the roll 16 is provided with slots $16^a$, $16^a$ (see Figure 4) to receive the peripheral edges of the blades or discs $12^a$ adjacent the point at which the stock engages the knives. This prevents bending of the knives under the cutting action and avoids beveling instead of square cutting the strips. It also reduces knife breakage. Roller 16 may be made up from a plurality of discs $16^b$ equal in thickness to the spaces between the knives $12^a$ and interspersed discs $16^c$, $16^c$ of less radius than discs $16^b$ and equal in thickness to the cutter discs $12^a$.

The cut stock tends to wedge between the knife blades or discs $12^a$ and to be carried around by the knives. To prevent this, and carry the strips of stock from between the knives as they are cut, a stock-diverting plate 30 is provided. This consists of a curved plate slitted as at $30^a$, $30^a$ so that it has prongs $30^b$, $30^b$ passing between the cutter blades, the diverting plate being pivoted on the brackets 11 as at 31 and having an arm or arms 32 thereon upon which tension springs 33 may act so as yieldingly to hold the diverting plate with its prongs between the cutter discs $12^a$.

To drive the cutter a sprocket 34 may be secured thereto over which is trained a chain 35 arranged to be driven by a sprocket 36 on a drive shaft 37. Shaft 37 may be power driven as by a pulley 38. The feeding rollers 16 and 17 may be driven from the drive shaft by arranging a gear 38 thereon meshed with a gear 39 secured to roller 16, rollers 16 and 17 having intermeshing gears 40 and 41 respectively secured thereto and adapted to mesh when the rollers are relatively moved together by operation of treadle 28. The gearing of the feed rolls and the cutter to the drive shaft 37 is such that the cutters will be rotated considerably faster than the stock is fed. This produces a smooth cutting action with no tendency for the machine to bind.

In use, the leading edge of the stock S is fed to the machine between the rollers 16 and 17 while separated. The treadle 28 is then depressed causing the stock to be forced by the rollers 16 and 17 against the cutter 12 which cuts the stock into strips $S^1$, $S^1$ (see Figure 4). These strips pass in between the knives but are diverted outwardly by plate 30. In the particular machine shown they are diverted downwardly and pass down through an opening $10^a$ in the top of support 10 and are removed from below the machine.

The invention has provided a very effective machine for cutting strips from tire carcass or like material which will be square-cut and true and which are economically produced thereby. Obviously, modifications of the invention may be resorted to without departing from the spirit thereof or the scope of the appended claims.

What is claimed is:

1. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, one of said rollers having slots therein into which the peripheries of said knives extend adjacent the point of cutting, a strip diverting element having prongs passing between said knives for diverting the cut strips of stock from between the knives, means for driving said feed rollers, and means for driving said cutter at faster peripheral speed than the peripheral speed of said feed rollers.

2. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, a strip diverting element having prongs passing between said knives for diverting the cut strips of stock from between the knives, means for driving said feed rollers, and means for driving said cutter at faster peripheral speed than the peripheral speed of said feed rollers.

3. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, one of said rollers having slots therein into which the peripheries of said knives extend adjacent the point of cutting, means for driving said feed rollers, and means for driving said cutter at faster peripheral speed than the peripheral speed of said feed rollers.

4. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, means for driving said feed rollers, and means for driving said cutter at faster peripheral speed than the peripheral speed of said feed rollers.

5. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, one of said rollers having slots therein into which the peripheries of said knives extend adjacent the point of cutting, a strip diverting element having prongs passing between said knives for diverting the cut strips of stock from between the knives, means for driving said feed rollers, and means for driving said cutter.

6. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, a strip diverting element having prongs passing between said knives for diverting the cut strips of stock from between the knives, means for driving said feed rollers, and means for driving said cutter.

7. A cutter for producing a plurality of strips of stock from rubberized laminated fabric material or the like comprising a rotary cutter including a plurality of spaced knives, means for feeding the material to said cutter comprising feed rollers, means for relatively moving said feed rollers to permit insertion of a leading end of the material therebetween and to press said material between the rollers, one of said rollers having slots therein into which the peripheries of said knives extend adjacent the point of cutting, means for driving said feed rollers, and means for driving said cutter.

MAURICE E. DAVIS.